United States Patent Office 2,756,224
Patented July 24, 1956

2,756,224

AZO-DYESTUFFS OF THE STILBENE SERIES

Raymond Gunst, Binningen, Switzerland, assignor to Ciba Limited, Basel, Switzerland, a Swiss firm No Drawing. Application January 12, 1953,
Serial No. 330,891

9 Claims. (Cl. 260—153)

This invention provides new azo-dyestuffs of the stilbene series which, like, for example, the dyestuff of the formula (1)
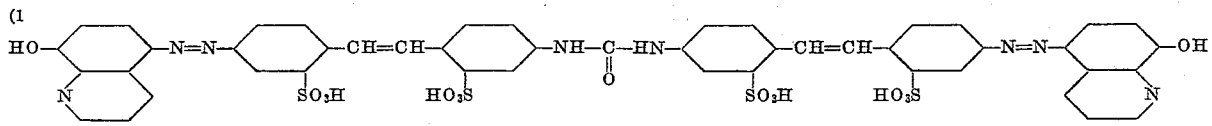

contain at most two azo linkages and at least one stilbene radical, which contains a sulfonic acid group in each of the 2- and 2'-positions and an azo linkage in at least one of the para-positions relatively to the —CH=CH— bridge, which azo linkage is bound to an 8-hydroxy-quinoline radical.

In accordance with the invention the above dyestuffs are made by coupling a stilbene compound which contains a sulfonic acid group in each of the 2- and 2'-positions and a diazotized amino group in at least one of the para-positions relatively to the —CH=CH— bridge, at least once with an 8-hydroxy-quinoline.

Accordingly, as an azo-component there is used an 8-hydroxy-quinoline capable of coupling such, for example, as 5-chloro-8-hydroxy-quinoline or advantageously 8-hydroxy-quinoline itself.

Valuable disazo-dyestuffs are obtained, for example, by coupling tetrazotized 4:4'-diaminostilbene-2:2'-disulfonic acid on both sides with azo components, that is to say, either on both sides with an 8-hydroxyquinoline or on one side with an 8-hydroxyquinoline and on the other with any desired azo component. The asymmetrical dyestuffs obtainable in this manner by the use of two different azo components are advantageously made by coupling a diazotized 4-aminostilbene-2:2'-disulfonic acid, which contains in the 4'-position a substituent convertible into an amino group, with an azo component, and then converting into an amino group the substituent so convertible, for example, a nitro group or acylamino group, diazotizing the amino-azo-dyestuff, and coupling it with a further azo-component, at least one of the azo-components being an 8-hydroxyquinoline. As second components for the production of asymmetrical dyestuffs there may be used, for example, a so-called yellow component, for example, a hydroxy-benzene ortho-carboxylic acid capable of coupling, such as 6-methyl-1-hydroxybenzene-2-carboxylic acid or 1-hydroxy-benzene-2-carboxylic acid, a pyrazolone such as 3-methyl-5-pyrazolone or 1-phenyl-3-methyl-5-pyrazolone or hydroxybenzene, it being desirable in the latter case to methylate or ethylate the hydroxyl group of the monoazo-dyestuff obtained from diazotized 4-amino-4'-nitro-stilbene-2:2'-disulfonic acid and hydroxybenzene before the nitro-group is reduced, the amino-compound is diazotized, and the diazo compound is coupled with an 8-hydroxyquinoline.

Valuable monoazo-dyestuffs can also be obtained in accordance with the present process by coupling a diazotized 4-amino-4'-acylaminostilbene-2:2'-disulfonic acid with an 8-hydroxyquinoline. The diazo components necessary for this method can be prepared by treating 4-amino-4'-nitro-stilbene-2:2'-disulfonic acid with an acylating agent, advantageously a benzoylating agent such as benzoyl chloride, para-chlorobenzoyl chloride or para-methoxybenzoyl chloride, and subsequently reducing the nitro group.

Especially valuable dyestuffs are obtained from a compound of the formula (2)
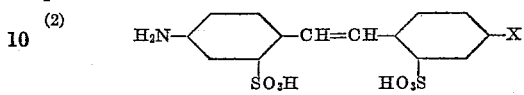

in which X represents a substituent convertible into an amino group, either by converting the —NH₂ group into a diazo group and coupling the resulting diazo-compound with an 8-hydroxyquinoline, or by converting the —NH₂ group by means of phosgene or a cyanuric halide, if desired with the aid of further condensations or azo couplings, into the group —NH—Y—HN—R₂, in which —HN—R₂ represents the radical of an amino-monoazodyestuff, advantageously one containing a group capable of forming metal complexes, and Y represents a —CO— group or a triazine radical, and subsequently converting the substituent X into an —NH₂ group, and then subjecting the latter to whichever of the two above-mentioned series of reactions has not yet been carried out.

As will be understood from the foregoing description fundamentally the same reactions are always used for making the last mentioned new dyestuffs, but these reactions may be carried out in different orders of succession.

Furthermore, the compound of the Formula 2 may first be converted by condensation with phosgene or a cyanuric halide into a compound of the formula (3)
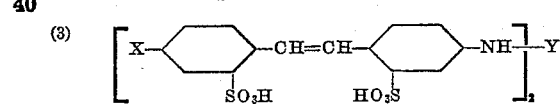

in which X as in the starting material represents a substituent convertible into an amino group, for example a nitro group or an acylamino group, advantageously one of simple constitution such as an acetylamino group, and Y represents a —CO— group or a triazine radical.

When a cyanuric halide, for example, cyanuric bromide or advantageously cyanuric chloride, is condensed with two molecular proportions of a compound of the Formula 2, the remaining reactive halogen atom of the cyanuric radical, if any reaction is to be carried out with it, may be converted by hydrolysis into a hydroxyl group or may be reacted with ammonia or a primary or secondary amine, especially arylamine such as aniline, N-methylaniline or their nuclear substitution products.

In the compounds of the Formula 3 so obtained the two substituents X are then converted into amino groups; when these substituents are nitro groups they are advantageously reduced by means of iron and acetic acid. Acylamino groups are advantageously hydrolyzed by heating the compound in a dilute solution of an alkali hydroxide.

The amino groups are then diazotized and the product is coupled with an 8-hydroxyquinoline capable of coupling. This coupling is advantageously carried out in a weakly acid to alkaline medium, for example, a medium rendered alkaline with an alkali hydroxide or an alkali carbonate.

Instead of starting from a compound of the Formula 3 there may be used as starting material a compound which contains only once the radical of the constitution (4) 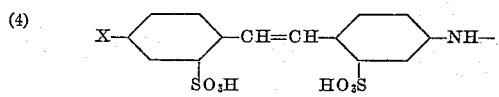

and which can be made, for example, by reacting one molecular proportion of a compound of the Formula 2 and one molecular proportion of an amino-azo-dyestuff (which does not correspond to the formula (5) 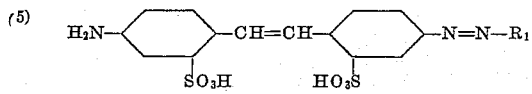

in which $R_1$ represents an 8-hydroxyquinoline radical) with phosgene, or by condensing together in the manner above described one molecular proportion of a compound of the Formula 2, one molecular proportion of a cyanuric halide and one molecular proportion of any desired amino-azo-dyestuff other than one corresponding to the Formula 5, and if desired, a monoamine free from azo linkages. In the condensation product so obtained the substituent X is converted into an amino group. The product is then diazotized and coupled with an 8-hydroxyquinoline.

The dyestuffs last mentioned above, which contain only a single 8-hydroxyquinoline radical, advantageously contain at least one further group capable of forming metal complexes, for example, an ortho-hydroxycarboxylic acid grouping or an ortho:ortho'-dihydroxy-azo-grouping. Especially valuble dyestuffs of this kind are obtained by converting a compound of the Formula 2 by condensation with phosgene or a cyanuric halide followed by conversion of the substituent X into an amino group into a compound of the formula (6) 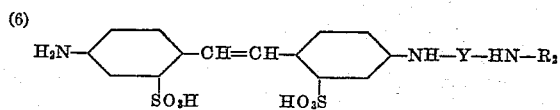

in which —HN—$R_2$ represents the radical of an amino-monoazodystuff and Y represents a —CO— group or a triazine radical, then diazotizing the amino group and coupling the product with an 8-hydroxyquinoline. As amino-azo-dyestuffs which provide the radical —HN—$R_2$ there come into consideration especially 4-amino-4'-hydroxy-1:1'-azo-benzene-3'-carboxylic acids which may contain further substituents such as methyl groups, halogen atoms, methoxy groups or sulfonic acid groups. A large number of such amino-monoazo-dyestuffs are known.

The new dyestuffs of the invention are suitable for dyeing a very wide variety of materials, for example, animal fibers such as wool, silk or leather, but especially for dyeing or printing cellulose-containing materials such as cotton, linen, and artificial silk or staple fibers of regenerated cellulose. The dyestuffs may be converted in substance, in the dyebath or on the fiber into complex metal compounds, for example, copper, chromium, iron, nickel or cobalt compounds. Conversion into such metal compounds is carried out by methods in themselves known in an acid, neutral or alkaline medium, under atmospheric or superatmospheric pressure, with or without additions such as salts of inorganic or organic acids such as tartaric acid, acid binding agents or agents favoring the formation of complexes such as pyridine. It is of special advantage to prepare the metal compounds, especially the copper compounds, in substance when the metal-free dyestuffs possess too little affinity and/or the metalliferous dyestuffs are sufficiently soluble. When the dyestuffs obtained by the present process do not contain too many groups imparting solubility (for example, only the sulfonic acid groups present in the stilbene radicals) they can advantageously be treated with an agent yielding metal on the fiber or partially on the fiber and partially in the dyebath by known methods. It is of advantage, for example, to use the process of U. S. Patent No. 2,148,659 in which first dyeing and then the treatment with an agent yielding metal are carried out in the same bath. As agents yielding metal there come into consideration advantageously those which are stable towards alkaline solutions, for example, complex copper tartrates.

In some cases, especially valuable dyeings can be produced by using the process in which a dyeing or print produced with the metal-free dyestuff is after-treated with an aqueous solution which contains a basic condensation product of formaldehyde with a compound containing in the molecule at least once the atomic grouping

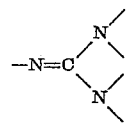

or with a compound, for example, cyanamide, easily convertible into a compound containing the aforesaid atomic grouping, and which also contains a water-soluble copper compound, especially a water-soluble complex copper compound. Such a process is described, for example, in British Patent No. 619,969.

Coppered dyeings obtainable with the new dyestuffs in the manner described above are distinguished above all by their very good fastness to light and washing.

The following examples illustrate the invention, the parts and percentages being by weight unless otherwise stated, and the relationship of parts by weight to parts by volume being the same as that of the kilogram to the liter:

*Example 1*

80 parts of 4-amino-4'-nitro-1:1'-stilbene-2:2'-disulfonic acid are dissolved in 1000 parts of water with the addition of a solution of sodium hydroxide in such manner that the clear solution has only a weakly alkaline reaction to Brilliant Yellow paper (pH=7.5 to 8.5). 100 parts of crystalline sodium acetate are then added as a buffer substance, the solution is heated to 40° C. and phosgene is slowly introduced while stirring very thoroughly. When after stirring for several hours the reaction mixture has become acid (pH below 5.5) the mixture is given a reaction alkaline to Brilliant Yellow paper by the addition of sodium carbonate, and phosgene is introduced until diazotizable amine can no longer be detected. It is of advantage during the whole period of the reaction to maintain the pH value of the mixtures between 8.5 and 5.5. The symmetrical urea derivative so obtained is precipitated from the weakly acid solution by the addition of sodium chloride and filtered off. The dinitro-compound is reduced to the diamino-compound in known manner with iron and dilute acetic acid.

76.6 parts of the resulting symmetrical urea of 4.4'-diamino-1:1'-stilbene-2:2'-disulfonic acid are dissolved in 700 parts of hot water with the addition of sodium carbonate so that the clear solution has a pH value of 8–9. 14 parts of sodium nitrite are added and the mixture is run while stirring well into a mixture of 55 parts by volume of hydrochloric acid of 30 per cent strength, water and ice. By the addition of ice the temperature is maintained at 10–12° C. After 2 hours the tetrazo-suspension is coupled at 0° C. with a solution which has been prepared by dissolving 30 parts of 8-hydroxyquinoline in 500 parts of water with the addition of 22 parts by volume of sodium hydroxide solution of 30 per cent. strength and 60 parts of sodium carbonate. After being stirred for several hours, the mixture is heated to 80° C. and the dyestuff of the formula

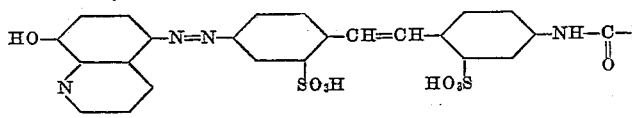

is precipitated by the addition of sodium chloride and filtered off. When dry it is a brown powder which dissolves in water with an orange coloration. It dyes cellulose fibers by the single bath or 2-bath after-coppering process red-orange tints of good fastness to washing and light.

*Example 2*

A solution of 20 parts of 4-nitro-4'-amino-1:1'-stilbene-2:2'-disulfonic acid and 10 parts of crystalline sodium acetate in 500 parts of water is added to a fine suspension of 9.2 parts of cyanuric chloride in a small amount of water, while stirring well. The resulting solution should have a pH value of at most 6.5. By the addition of ice the temperature of the reaction mixture is prevented from exceeding 5° C. After 15 minutes there is again added a similar solution of 21 parts of 4-nitro-4'-amino-1:1'-stilbene-2:2'-disulfonic acid and 10 parts of crystalline sodium acetate in 500 parts of water, and the reaction temperature is raised to 40–50° C. while stirring well. After 3 hours the temperature is raised to 60° C., and 6 parts of aniline are added, the temperature is raised to 80–85° C. and this temperature is maintained for 2 hours while stirring. The ternary condensation product so formed is brought into solution by the addition of ammonia until the reaction is distinctly alkaline. The solution is allowed to cool to 60° C., and the dinitro-compound is reduced to the diamino-compound by the addition of a concentrated aqueous solution of 20 parts of sodium hydrosulfide. The temperature rises spontaneously to 70° C. owing to the reaction. The mixture is maintained at that temperature for 3 hours while stirring. The reaction mixture is then cooled to 20° C., and the diamino-triazine derivative so formed is precipitated by acidification and filtered off.

45 parts of the resulting diamino-triazine derivative are dissolved in the form of the sodium salt in 500 parts of water, then mixed with 7 parts of sodium nitrite, and run, while stirring well, into a mixture of 25 parts by volume of hydrochloric acid of 30 per cent. strength, water and ice. After stirring for 2 hours, during which the temperature may rise to 15° C., coupling is brought about with a solution of 8-hydroxyquinoline prepared as follows: 15 parts of 8-hydroxyquinoline are dissolved in 300 parts of water with the addition of 12 parts by volume of sodium hydroxide solution of 30 per cent. strength and 30 parts of sodium carbonate. The coupling is carried out at 0° C. After stirring for several hours the dyestuff formed is separated by the addition of sodium chloride at a raised temperature and filtered off. The dried dyestuff of the formula is a brown powder which dissolves in water with an orange coloration, and dyes cellulose fibers by the single

bath or 2-bath after-coppering process fast reddish orange tints.

By using for the third stage of condensation in preparing the ternary triazine condensation product, instead of aniline, N-methyl-aniline or 1-amino-4-hydroxybenzene-3-carboxylic acid, and otherwise proceeding exactly in the manner described in this example, there is obtained a similar dyestuff which also dyes cellulose fibers by the single bath or 2-bath after-coppering process fast reddish orange tints.

*Example 3*

20 parts of 4-amino-4'-nitro-1:1'-stilbene-2:2'-disulfonic acid and 20 parts of the amino-monoazo-dyestuff from 4-diazo-1-hydroxybenzene-6-sulfonic acid-2-carboxylic acid and 4-amino-3-methoxy-6-methylbenzene are dissolved together in 1500 parts of water with the addition of sodium hydroxide solution in such manner that the clear solution has an only weakly alkaline reaction to Brilliant Yellow paper (pH value=7.5 to 8.5). 20 parts of anhydrous sodium carbonate are then added, the solution is heated to 40° C., and phosgene is slowly introduced while stirring very well. When after stirring for several hours the pH value of the reaction mixture has fallen below 5.5, a pH value of 8.5 to 9.0 is re-established by the addition of sodium carbonate, and phosgene is introduced until diazotizable amine can no longer be detected. The reaction mixture, which contains as its main constituent the asymmetrical urea derivative of the formula

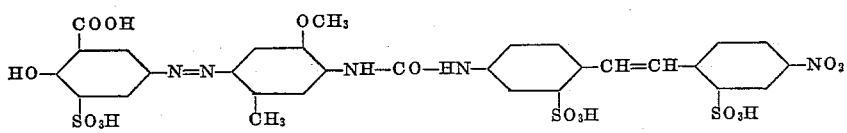

is dissolved by the addition of 20 parts of sodium carbonate and heated to 60° C., and a concentrated solution of 20 parts of crystalline sodium sulfide is added in one portion. The temperature rises spontaneously to about 65° C. and the original orange color of the solution changes towards red-violet. The whole is stirred for a further 30 minutes at 70° C., and then the reduction product is precipitated by acidification and filtered off. In order to remove any radicals of sulfur, the filter cake is dissolved in hot water containing sodium carbonate, the solution is filtered, and the dyestuff is again precipitated with sodium chloride. For the purpose of diazotization the sodium salt so obtained is suspended in 500 parts of water, 7 parts of sodium nitrite are added, and the mixture is run while stirring well into a mixture of 35 parts by volume of hydrochloric acid of 30 per cent. strength, water and ice. By the addition of ice the temperature is maintained at 5–10° C. The finished diazo-compound is filtered off, stirred with ice and water, and then a solution of 7.5 parts of 8-hydroxyquinoline in 50 parts of alcohol is added. A sufficient

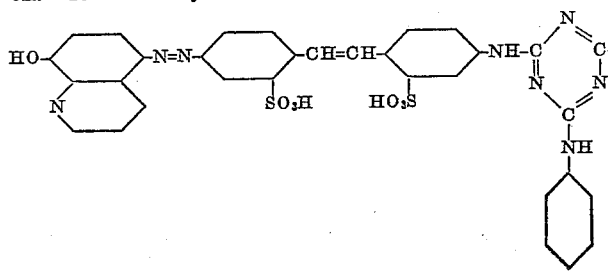

quantity of sodium hydroxide solution is introduced dropwise into the mixture to produce a reaction weakly alkaline to Brilliant Yellow paper. The resulting dyestuff of the formula

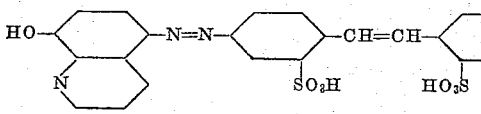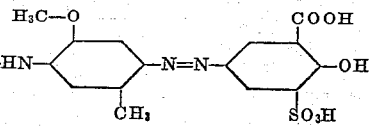

can be filtered off without the addition of sodium chloride. When dry it is a brown powder which dissolves in water with a yellow coloration. It dyes cellulose fibers by the single bath or 2-bath after-coppering process yellow orange tints of excellent fastness to washing and good fastness to light.

*Example 4*

37 parts of 4:4'-diaminostilbene-2:2'-disulfonic acid

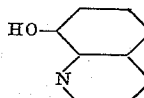

are dissolved in 1000 parts of water with the aid of sodium hydroxide solution in such manner that the reaction of the mixture is weakly alkaline to Brilliant Yellow paper. 14 parts of sodium nitrite are then added in the form of a concentrated aqueous solution, and the mixture is run while stirring well into dilute hydrochloric acid. By the addition of ice the temperature is maintained at 10–12° C. After one hour there is added to the tetrazo-suspension a solution of 30 parts of 8-hydroxyquinoline, which has been dissolved in the form of its semi-sulfate in 300 parts of water by the addition of sulfuric acid. The coupling mixture is rendered alkaline by throwing in 80 parts of sodium carbonate in the course of 30 minutes. The resulting symmetrical disazo-dyestuff of the formula

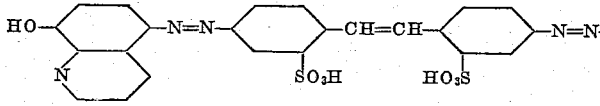

can be filtered off without the addition of sodium chloride. When dry it is a dark powder having a bronze lustre which dissolves in water with a violet coloration. On cellulose fibers it yields by the single bath or 2-bath after-coppering process bluish-red tints of very good fastness to washing and light.

*Example 5*

40 parts of 4-amino-4'-nitro-1:1'-stilbene-2:2'-disulfonic acid are dissolved in 1000 parts of water in the form of the sodium salt, 7 parts of sodium nitrite are added in the form of a concentrated aqueous solution, and the mixture is diazotized at 10–12° C. by running it into a mixture of hydrochloric acid, water and ice. After stirring it for one hour, the diazo suspension is added at 0° C. to a solution of 14 parts of 1-hydroxy-benzene-2-carboxylic acid in 40 parts of sodium carbonate in 300 parts of water. When the coupling is finished, the mixture is heated to 50° C., and in order to reduce the nitro group there is added a solution of 16 parts of sodium hydrosulfide in 50 parts of water. The mixture is stirred for one hour at 55° C. The cooled solution is rendered acid to Congo paper with hydrochloric acid and filtered. The filter residue is taken up in 1200 parts of water, then rendered distinctly alkaline by the addition of ammonium hydroxide solution, and dissolved with the aid of heat. Any sulfur residues are removed from the solution by filtration, and the ammonium salt of the aminoazo-dyestuff is precipitated by the addition of sodium chloride and filtered off. The filter residue is again stirred in 700 parts of water, then mixed with 7 parts of sodium nitrite in the form of a concentrated aqueous solution, and run into a mixture of 35 parts by volume of hydrochloric acid of 30 per cent. strength, water and ice. At a temperature of 5–10° C. the diazotization is complete in about 3 hours. The diazo compound is filtered off, slightly washed, and stirred in a small amount of water. For the purpose of coupling there is added to the diazo-suspension a solution of 15 parts of 8-hydroxyquinoline dissolved in the form of its semi-sulfate in 150 parts of water by the addition of sulfuric acid, and the coupling mixture is rendered very weakly alkaline by gradually throwing in ammonium carbonate. The resulting disazo-dyestuff of the formula

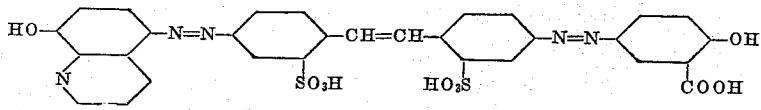

precipitates without the addition of sodium chloride and can be filtered off. It is a dark powder which dissolves in water with a yellow-red coloration and dyes cellulose fibers by the single bath or 2-bath after-coppering process red tints which are fast to washing and light.

*Example 6*

40 parts of 4-amino-4'-nitro-1:1'-stilbene-2:2'-disulfonic acid are diazotized in the manner described in Example 5, and coupled with 17.5 parts of 1-phenyl-3-methyl-5-pyrazolone in a solution rendered alkaline with sodium carbonate. The further procedure is the same as in Example 5, that is to say, the nitro-monoazo-dyestuff is reduced with sodium hydrosulfide to the aminoazo-dyestuff, and the latter is diazotized and coupled with

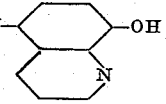

15 parts of 8-hydroxyquinoline. In this manner there is obtained a dyestuff having similar properties, which dyes cellulose fibers by the single bath or 2-bath after-coppering process red tints which have a distinctly more bluish shade than those produced with the dyestuff of Example 5.

*Example 7*

47.4 parts of 4'-benzoylamino-4-amino-1:1'-stilbene-2:2'-disulfonic acid (prepared in known manner by treating 4'-amino-4-nitro-1:1'-stilbene-2:2'-disulfonic acid with benzoyl chloride and then reducing the nitro group to an amino group) are dissolved in the form of the sodium salt in 800 parts of water, then mixed with 7 parts of sodium nitrite, and the solution is run while stirring well into a mixture of 25 parts by volume of hydrochloric acid of 30 per cent. strength, water and ice. The whole is stirred for 2 hours and maintained at a temperature between 5 and 10° C. For the purpose of coupling a solution of 15 parts of 8-hydroxyquinoline in 50 parts of alcohol is added, and the coupling mixture is rendered neutral to weakly alkaline by the dropwise addition of a sodium hydroxide solution of 30 per cent. strength. The new dyestuff may be precipitated by the addition of sodium chloride. It is a yellow-brown powder which dissolves in water with a red coloration and dyes cellulose fibers by the single bath or 2-bath after-coppering process fast orange tints.

*Example 8*

In a dyebath consisting of 4000 parts of water, 2 parts of anhydrous sodium carbonate and 1 part of the dyestuff obtainable as described in the first and second paragraphs of Example 2 there are entered at 50° C., 100 parts of cotton. The temperature is raised to 90–95° C. in the course of 20 minutes, 30 parts of crystalline sodium sulfate are added, and dyeing is carried on for 30 minutes at 90–100° C. The whole is then allowed to cool to 70° C. and the further treatment is as described below in paragraph (a), (b) or (c).

(a) The dyeing is rinsed with cold water and treated for ½ hour at 50° C. in a bath containing in 4000 parts of water, 3 parts of crystalline copper sulfate and 1 part of acetic acid. The material is then rinsed and dried. There is obtained an orange dyeing having very good properties of wet fastness and very good fastness to light.

(b) There are added to the dyebath cooled to about 70° C., 4 parts of complex copper sodium tartrate of approximately neutral reaction, coppering is carried on for ½ hour at about 80° C., and the dyed material is rinsed with cold water. If desired, the dyeing may be so soaped by after-treatment for ½ hour in a bath containing per liter of water 5 grams of Marseilles soap and 2 grams of anhydrous sodium carbonate. There is obtained an orange dyeing of very good fastness to light and having very good properties of wet fastness.

(c) The dyeing is rinsed with cold water and then after-treated for ½ hour at 20° C. in a solution prepared by dissolving 4.5 parts of a water-soluble condensation product of dicyandiamidine and formaldehyde, 1.5 parts of copper acetate and 6 parts of a concentrated aqueous solution of ammonia in 3000 parts of water and adding 2 parts of anhydrous sodium carbonate to the solution containing cupric tetrammine acetate. The material is then rinsed and dried. There is obtained an orange dyeing which is distinguished by very good fastness to light and properties of wet fastness.

What is claimed is:

1. A disazo dyestuff of the stilbene series which corresponds to the formula

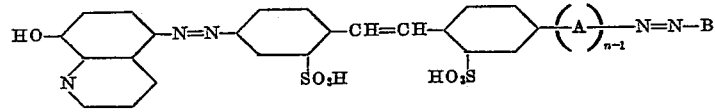

in which $n$ represents a whole number of at the most 2, A represents a radical selected from the group of the radicals corresponding to the formulae

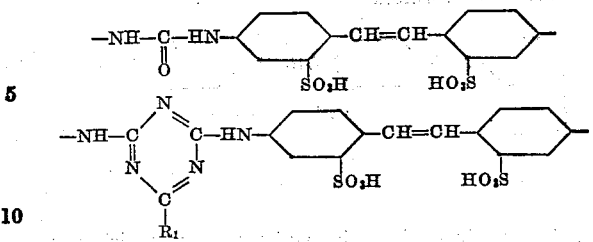

and

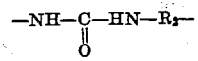

wherein $R_1$ represents the radical of an aromatic amine bound to the triazine ring by its amino nitrogen atom and containing one carbocyclic six-membered ring and $R_2$ represents an aromatic radical containing one carbocyclic six-membered ring, and B represents a radical selected from the group consisting of the radical of 8-hydroxyquinoline bound to the azo group in its 5-position, the radical of a 1-hydroxybenzene-2-carboxylic acid bound to the azo group in its 4-position and the radical of a 5-pyrazolone bound to the azo group in its 4-position.

2. A disazo dyestuff of the stilbene series which corresponds to the formula

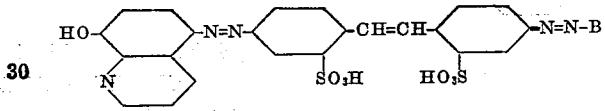

in which B represents the radical of a 1-hydroxybenzene-2-carboxylic acid bound to the azo group in its 4-position.

3. A disazo dyestuff of the stilbene series which corresponds to the formula

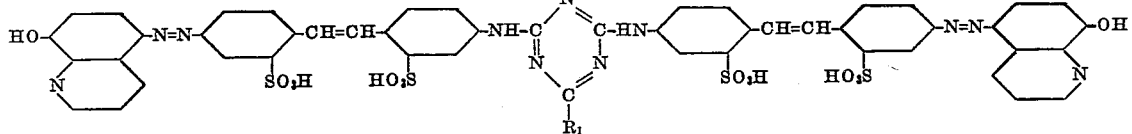

in which $R_1$ represents the radical of an aromatic amine bound to the triazine ring by its amino nitrogen atom and containing one carbocyclic six-membered ring.

4. A disazo dyestuff of the stilbene series which corresponds to the formula

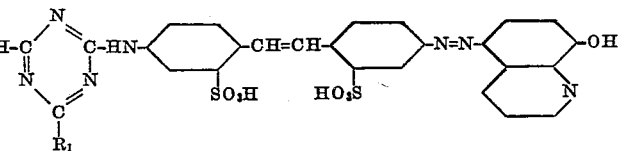

in which $R_2$ represents an aromatic radical containing one carbocyclic six-membered ring and B represents the radical of a 1-hydroxybenzene-2-carboxylic acid bound to the azo group in its 4-position.

5. An azo-dyestuff of the stilbene series which corresponds to the formula

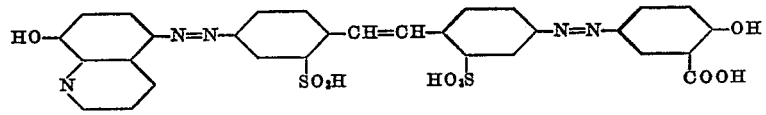

6. An azo-dyestuff of the stilbene series which corresponds to the formula

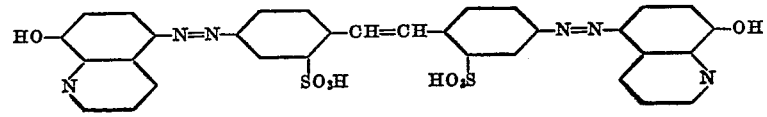

7. An azo-dyestuff of the stilbene series which corresponds to the formula
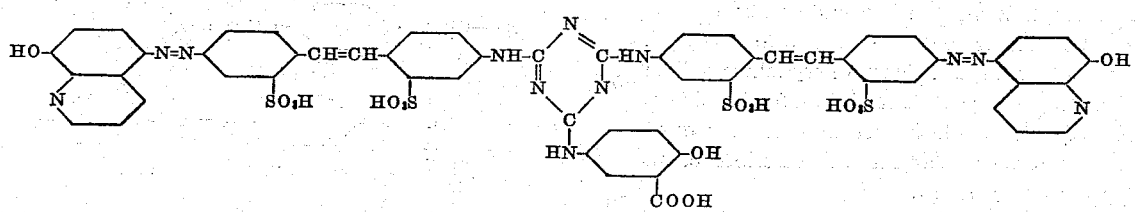
8. An azo-dyestuff of the stilbene series which corresponds to the formula
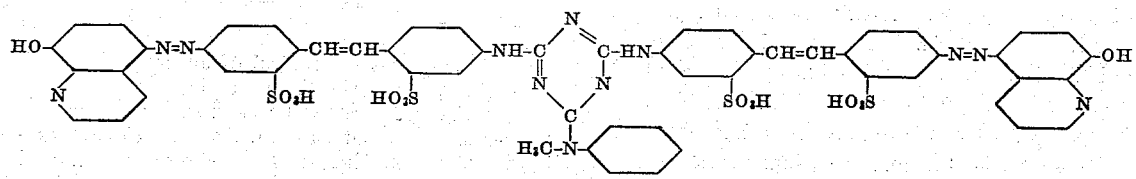
9. An azo-dyestuff of the stilbene series which corresponds to the formula
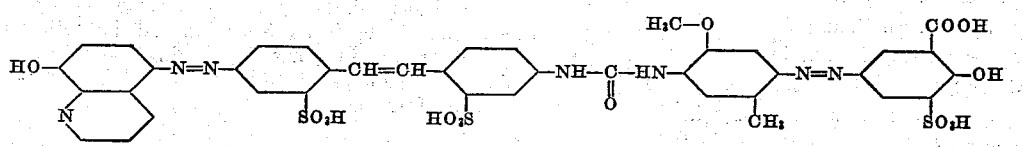
References Cited in the file of this patent
UNITED STATES PATENTS
| | | |
|---|---|---|
| 2,004,250 | Schindhelm et al. | June 11, 1935 |
| 2,099,168 | Kunz et al. | Nov. 16, 1937 |
| 2,270,478 | Schmid | Jan. 20, 1942 |